United States Patent
Fattic et al.

(10) Patent No.: US 7,475,671 B1
(45) Date of Patent: Jan. 13, 2009

(54) METHOD FOR COMPENSATING INJECTION TIMING DURING TRANSIENT RESPONSE OF PRE-MIXED COMBUSTION

(75) Inventors: Gerald T. Fattic, Fishers, IN (US); Harry L. Husted, Luxembourg (LU)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 12/004,654

(22) Filed: Dec. 21, 2007

(51) Int. Cl.
*F02P 5/00* (2006.01)
*B60T 7/12* (2006.01)

(52) U.S. Cl. .............................. 123/406.47; 123/406.5; 701/105

(58) Field of Classification Search .................. 123/319, 123/325, 339.1, 406.47, 406.5; 701/103, 701/104, 105, 110
See application file for complete search history.

(56) References Cited

U.S. PATENT DOCUMENTS

| | | | | |
|---|---|---|---|---|
| 6,994,077 | B2 * | 2/2006 | Kobayashi et al. | 123/568.11 |
| 2002/0011233 | A1 * | 1/2002 | Shiraishi et al. | 123/294 |
| 2004/0182359 | A1 * | 9/2004 | Stewart et al. | 123/295 |
| 2005/0229903 | A1 * | 10/2005 | Kobayashi et al. | 123/435 |
| 2006/0112928 | A1 * | 6/2006 | Coleman et al. | 123/305 |
| 2006/0169243 | A1 * | 8/2006 | Neunteufl et al. | 123/295 |
| 2007/0089697 | A1 * | 4/2007 | Hara et al. | 123/90.15 |
| 2007/0250256 | A1 * | 10/2007 | Kang et al. | 701/115 |
| 2008/0082250 | A1 * | 4/2008 | Husted et al. | 701/115 |

OTHER PUBLICATIONS

SAE Technical Paper No. 2007-01-0773, "Cylinder Pressure-Based Control of Pre-Mixed Diesel Combustion," 2007 World Congress; Detroit, Michigan; Apr. 16-19, 2007.

* cited by examiner

*Primary Examiner*—John T Kwon
(74) *Attorney, Agent, or Firm*—Paul L. Marshall

(57) ABSTRACT

A method for compensating fuel injection timing when a torque signal or throttle command indicates that a transient operation is about to transpire. The control adjusts the fuel injection timing in advance of the transient operation to prevent loss of torque due to change in combustion phase position. During engine operation in pre-mix mode of combustion, rapid changes in fueling quantity can affect the combustion angle as well as the temperature in the combustion chamber, causing late or early combustion phasing. The present invention anticipates a change in combustion phasing by sensing a change in demanded fueling rate. The Engine Control Module (ECM) then applies a nest of algorithms to advance fuel injection timing during acceleration or to shorten ignition delay for deceleration by retarding fuel injection timing. As the engine returns to steady state operation, the compensation in injection timing is progressively reduced to zero.

9 Claims, 3 Drawing Sheets

STEADY STATE
INJECTION TIMING

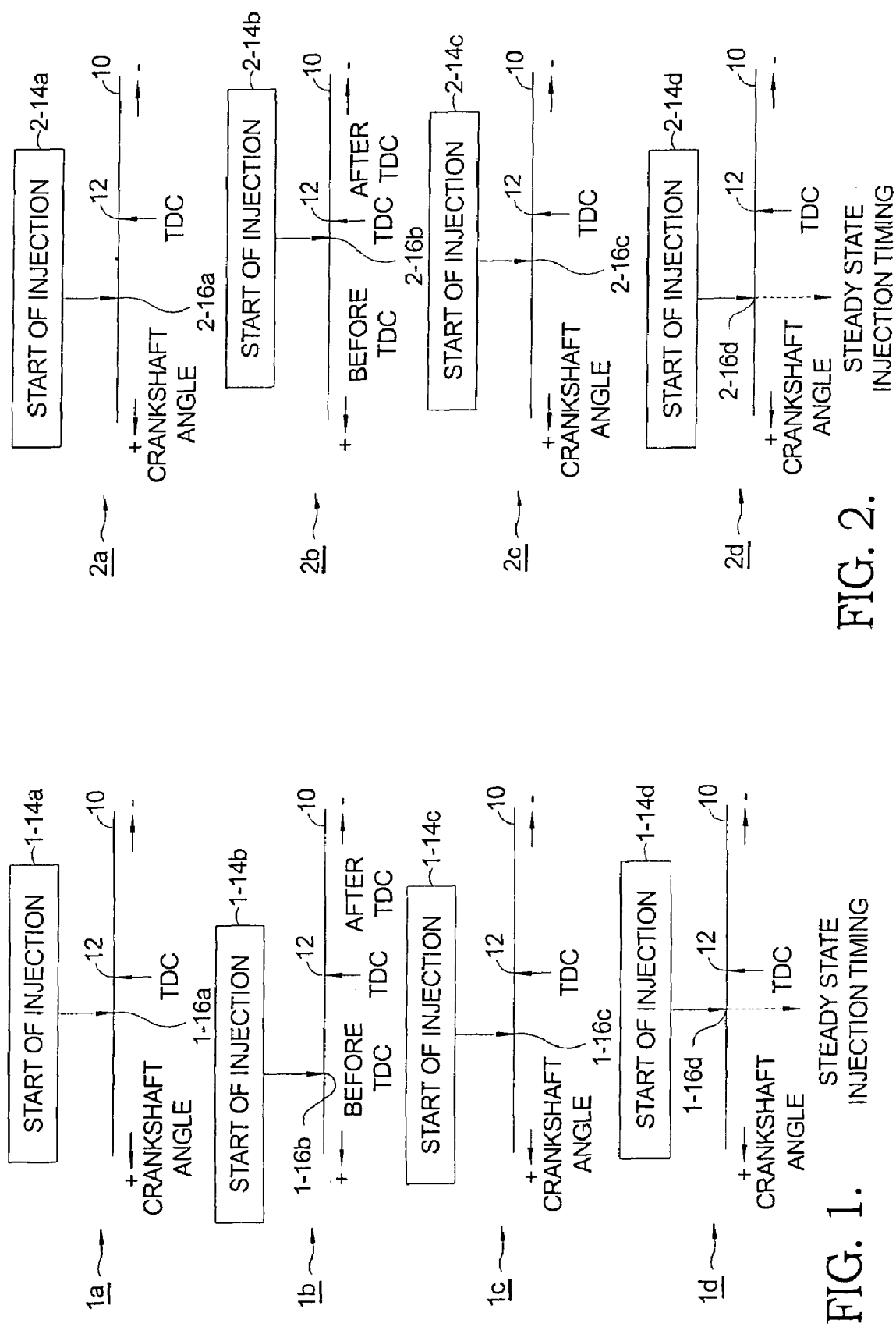

METHOD FOR COMPENSATING INJECTION TIMING DURING TRANSIENT RESPONSE OF PRE-MIXED COMBUSTION

TECHNICAL FIELD

The present invention relates to combustion control in compression-ignited (CI) internal combustion engines; more particularly, to means for regulating the timing of fuel injection in such engines; and most particularly, to a method for compensating the timing of fuel injection in such engines to maintain optimal combustion during periods of transient engine response, such as during acceleration and deceleration.

BACKGROUND OF THE INVENTION

Diesel-type compression ignition (CI) internal combustion engines achieve combustion by compressing a charge of air in the firing cylinder and injecting one or more portions of fuel into the compressed air, creating a fuel/air mixture that is spontaneously combustible at a threshold combination of temperature and cylinder pressure. The apparatus, methods, and timing of the fuel injections to maximize fuel efficiency and engine performance and to minimize exhaust pollutants are the subjects of a highly-developed engineering prior art.

In early diesel art, fuel injection was carried out as a single injection at or near the top dead center (TDC) of the compression stroke of the engine piston. More recently, it has been recognized that improved fuel economy and engine efficiency, and reduced pollution, can be achieved by injecting fuel multiple times during the compression stroke to provide a more uniformly dispersed and evaporated fuel/air charge that ideally will detonate uniformly and simultaneously throughout the firing chamber, rather than simply combusting in a lower-energy progressive wave from an initial site.

It has further been found that timing of the onset of fuel injection is a critical factor in achieving these goals. Implementation of real-time combustion feedback for use in closed-loop combustion control is a technology that has potential to assist in the successful production implementation of advanced diesel combustion modes.

Low-temperature, pre-mixed diesel combustion is of interest because it offers the ability to lower the engine-out emissions of oxides of nitrogen (NOx) and particulate matter (PM) such as carbon soot. The need for lowering these two emissions is driven by tighter regulations enacted worldwide, especially concerning NOx limits. Reducing engine-out emissions eases the need for additional exhaust aftertreatment devices and their associated cost and mass.

Low-temperature, pre-mixed combustion in diesel engines consists of injecting the fuel such that it is allowed to vaporize and mix with the intake mixture before combustion occurs. A high level of exhaust gas recirculation (EGR) is often used to reduce the combustion temperature. Since all of the fuel typically is injected prior to the start of combustion, the crank angle when combustion starts is controlled by the chemical reaction kinetics of the mixture, which are directly influenced by the pressure and temperature of the mixture, among a number of other factors. This introduces new variability factors that are not present in traditional diffusion-burn diesel combustion wherein start of combustion occurs at a cetane-number-based time delay after the start of fuel injection.

While pre-mixed combustion is desirable for emissions reduction, a challenge is in maintaining the stability of combustion during transient events and transitions between combustion modes. Closed-loop feedback control of fuel injection timing offers the potential to improve controllability of pre-mix combustion, thus enabling a means of improving engine-out exhaust emissions.

A known approach for controlling fuel injection timing is disclosed in SAE Technical Paper No. 2007-01-0773, the relevant disclosure of which is herein incorporated by reference, wherein in-cylinder combustion pressure is used for providing combustion feedback. When sampled real-time with the appropriate electronics, the resulting cylinder pressure waveform can be analyzed to determine combustion parameters such as the angle of start of combustion; indicated mean effective pressure (IMEP); angular location corresponding to when 50% of the total heat release has occurred; and the angular location of peak pressure (LPP). Such combustion feedback can then be used to adjust relevant engine control parameters, including timing of the start of fuel injection. By having a pressure sensor in each cylinder of a multi-cylinder engine, combustion feedback allows for combustion phasing on an individual cylinder basis and a resulting ability to correct for cylinder-to-cylinder variations as well as to follow a commanded target value.

A shortcoming of the disclosed system is that it requires substantial and sophisticated hardware, including electronic pressure sensing means in each cylinder, which is not readily available in either sufficiently-rugged form to permit widespread adoption or at a reasonable unit cost.

What is needed in the art is a simplified means for controlling fuel injection timing to improve engine performance, especially in mass-produced road-use vehicle engines, and especially during transient periods of engine operation.

It is a principal object of the present invention to improve CI engine performance and reduce NOx and PT emissions during transient periods of engine operation.

SUMMARY OF THE INVENTION

A method in accordance with the present invention compensates fuel injection timing when a torque signal or throttle command indicates that a transient operation is about to transpire. The control adjusts the fuel injection timing in advance of the transient operation to prevent loss of torque due to change in combustion phase position.

During engine operation in the pre-mix mode of combustion, rapid changes in fueling quantity resulting from a change in throttle position can affect the resulting combustion angle as well as the temperature in the combustion chamber, causing non-optimally late or early combustion phasing during transient operation. The present invention anticipates a change in combustion phasing by sensing in real time a change in demanded fueling rate. The Engine Control Module (ECM) then applies a nest of algorithms to advance or retard the fuel injection timing during acceleration or to shorten ignition delay for deceleration by retarding fuel injection timing. As the engine progressively returns to steady state operation, the compensation in injection timing is progressively reduced to zero as injection timing returns to nominal.

BRIEF DESCRIPTION OF THE DRAWINGS

The present invention will now be described, by way of example, with reference to the accompanying drawings, in which:

FIGS. 1a through 1d are schematic time lines of fuel injection timing for four steps in combustion control during an engine acceleration event;

FIGS. 2a through 2d are schematic time lines of fuel injection timing for four steps in combustion control during an engine deceleration event;

DESCRIPTION OF THE PREFERRED EMBODIMENTS

Referring to FIGS. 1 and 2, the horizontal line 10 represents the crankshaft angle, and TDC 12 is the Top Dead Center position of the crankshaft. A timing change in the plus direction represents a timing advance, and a timing change in the minus direction represents a timing retard. At the start of the present method, FIG. 1a or 2a, the start 1-14a,2-14a of fuel injection is at a predetermined crankshaft angle 1-16a,2-16a ahead of TDC 12.

For an acceleration event (FIG. 1) when the engine is operating in a pre-mixed fuel injection mode, as the start of a transient event is sensed by the ECM, FIG. 1b, the algorithms of the invention, as discussed below, advance the start 1-14b of fuel injection to a new crankshaft angle 1-16b farther ahead of TDC 12 to allow more time for the fuel and gases in the engine cylinder to mix and reach the combustion point at the optimal crankshaft angle. This avoids late combustion phasing which results in partial burn or misfire. With rapid electronic feedback of throttle position and of various other engine operating parameters, the algorithms can be implemented by the ECM within a single engine revolution. The transient event is defined as a change in throttle position exceeding a threshold limit which is engine-speed dependent (look-up table 306 and 406 in FIGS. 3 and 4). FIGS. 1a-1d describe an engine acceleration sequence resulting from an advance in throttle position.

As the transient acceleration event proceeds (FIG. 1c) the advance 1-16c of the start of fueling 1-14c is gradually reduced until a steady-state operating condition (FIG. 1d) is re-established at the new throttle position 1-16d.

Referring to FIGS. 2a through 2d, during a deceleration event when the engine is operating in a pre-mixed fuel injection mode, analogous actions are taken in the opposite direction, i.e., the start of fuel injection 2-14a is initially retarded 2-14b, and then is gradually advanced, FIG. 2c, until a steady-state operating condition, FIG. 2d, is re-established at the new throttle position 2-16d.

Figure 3:
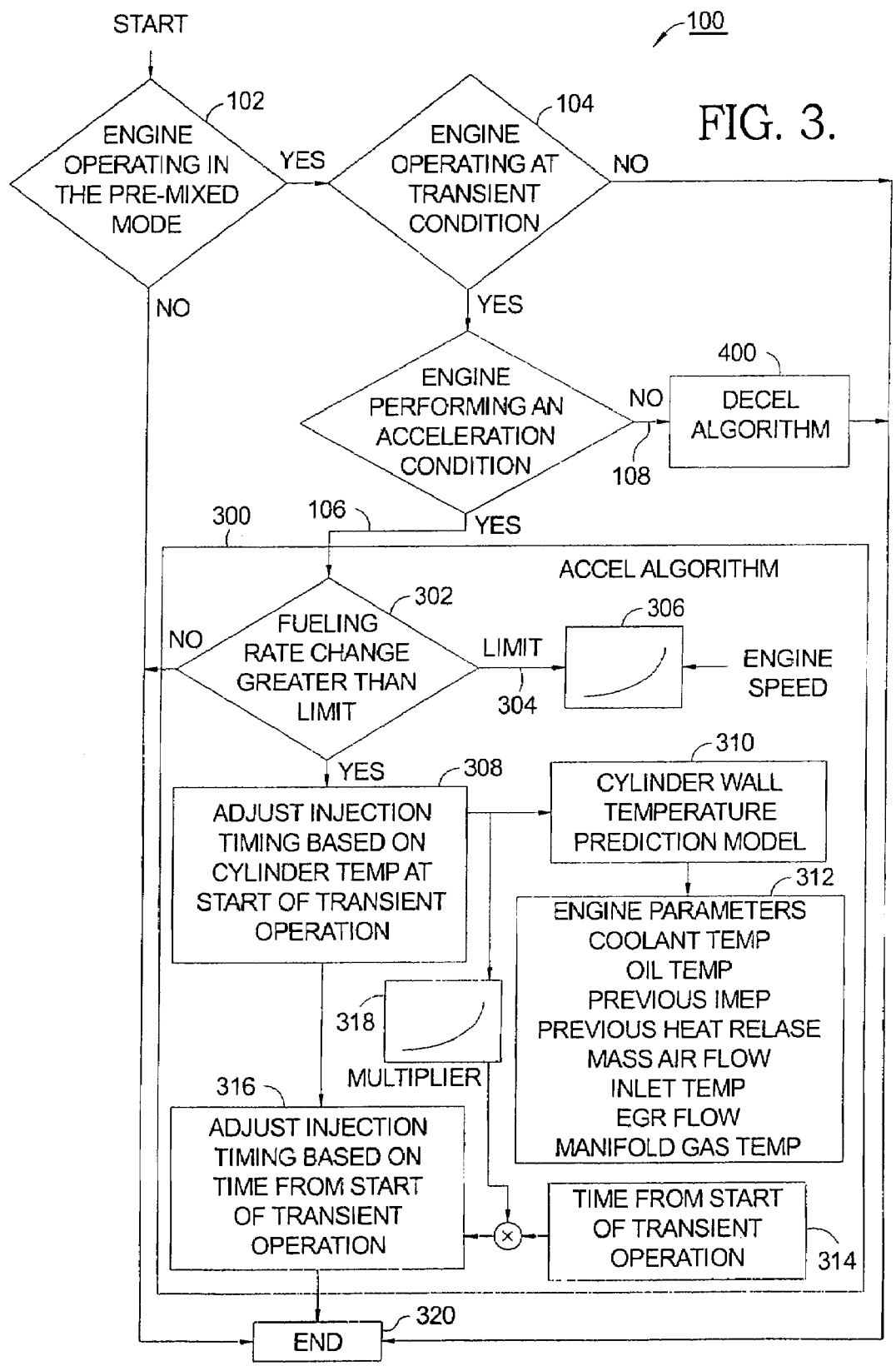
FIG. 3 is a master algorithm for a fuel injection timing control scheme in accordance with the invention, including a sub-algorithm for use during an engine acceleration event.

Referring now to FIG. 3, an algorithm 100 in accordance with a method of the present invention for use in an Engine Control Module of a CI engine to provide adjusted fuel injection timing in response to a sensed change in fueling rate is preferably contingent on the engine's operating in pre-mixed mode. In use, algorithm 100 cycles on a short time schedule, on the order of a few milliseconds, to maintain engine control at all times.

When pre-mix mode is confirmed 102, algorithm 100 confirms that the engine is operating at a transient condition 104, defined as a predetermined percentage change in an operating function, preferably throttle position. Algorithm 100 then determines whether the transient condition is an acceleration 106, in which case sub-algorithm 300 is selected, or a deceleration 108, in which case sub-algorithm 400 (FIG. 4) is selected.

Referring now to FIGS. 1 and 3, sub-algorithm 300 first confirms that a fueling rate change (increase) 302 greater than a predetermined limit 304 has taken place. Limit 304 is determined from an embedded look-up table 306 of fueling rate change as a function of engine speed during acceleration. A fueling timing adjustment command 308 based on a measured engine operating parameter such as the cylinder wall temperature 310 at the start of the acceleration event is issued to the fuel injectors (corresponds to FIG. 1b), shifting the fuel injection timing 1-14b to an advanced crankshaft angle 1-16b. Cylinder wall temperature 310 is calculated in known fashion from one or more embedded look-up tables generated, for example, by a representative engine on a dynamometer test stand in an engine laboratory. The operating parameters 312 that contribute to the cylinder wall calculation are selected from the group consisting of coolant temperature, oil temperature, previous IMEP, previous heat release, mass air flow, air inlet temperature, exhaust gas recirculation flow, and intake manifold gas temperature, all of which are continuously monitored by the ECM.

As time elapses 314 after the start of the acceleration event, the fuel injection timing advance is reduced progressively 316 via a time-dependent continuously-revised cylinder wall temperature multiplier 318 to successive intermediate crankshaft angles 1-16c. At the end 320 of a period of time, the acceleration event is concluded and the engine is returned to a fuel injection timing 1-14d for operation at the new steady-state condition at crankshaft angle 1-16d.

Figure 4:
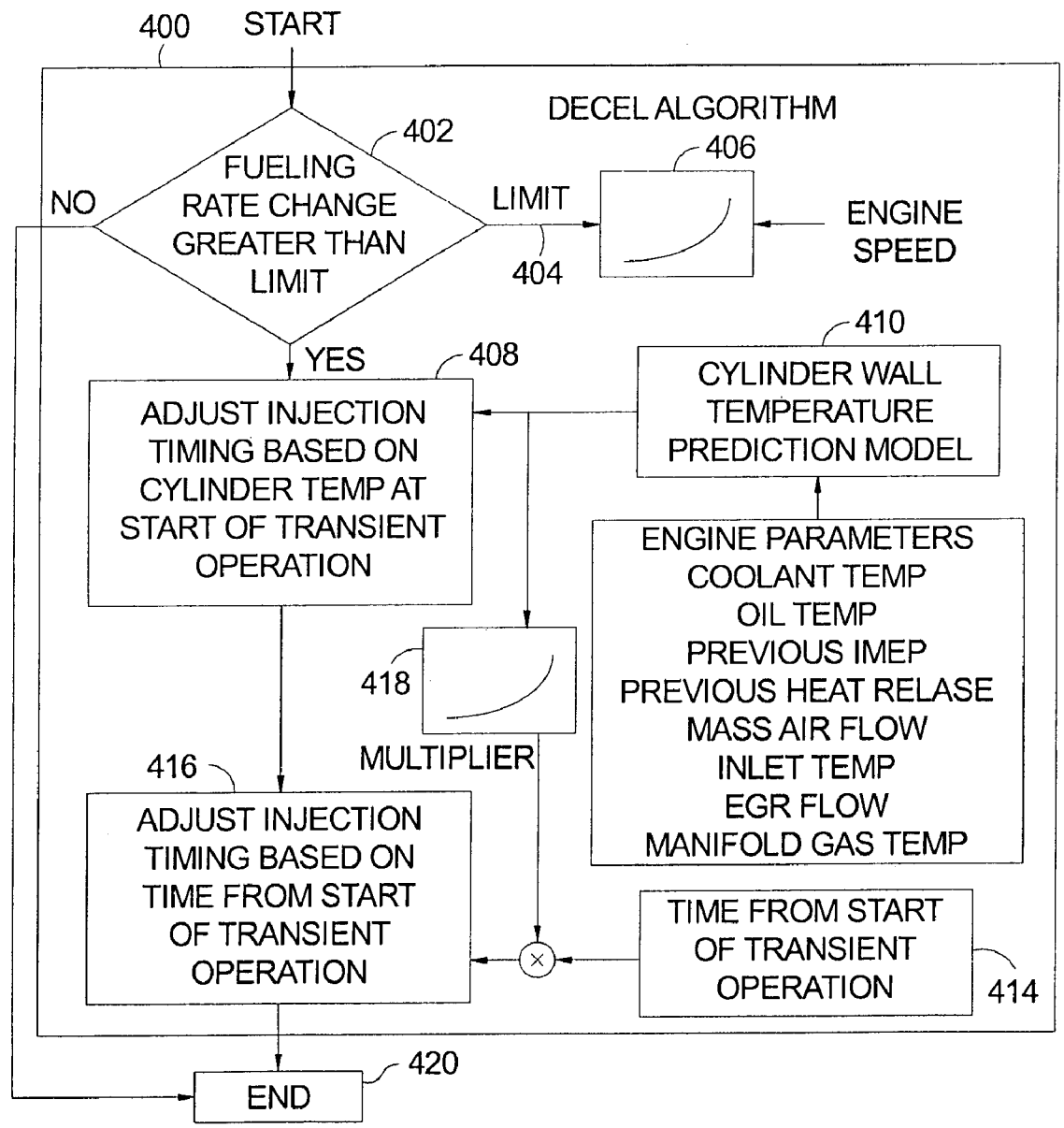
FIG. 4 is a sub-algorithm for use with the master algorithm shown in FIG. 3 during an engine deceleration event.

Referring to FIGS. 2 and 4, deceleration sub-algorithm 400 is entirely analogous to, and substantially duplicative of, acceleration sub-algorithm 300.

Sub-algorithm 400 first confirms that a fueling rate change (decrease) 402 greater than a predetermined limit 404 has taken place. Limit 404 is determined from an embedded look-up table 406 of fueling rate change as a function of engine speed during deceleration. A fueling timing adjustment command 408 based on the cylinder wall temperature 410 at the start of the deceleration event, which is identical to cylinder wall temperature 310, is issued to the fuel injectors, shifting the fuel injection timing 2-14b to retarded crankshaft angle 2-16b.

As time elapses 414 after the start of the deceleration, the fuel injection timing retard 2-14c is increased progressively 416 via a time-dependent continuously-revised cylinder wall temperature multiplier 418 to successive intermediate crankshaft angles 2-16c. At the end 420 of a period of time, the deceleration event is concluded and the engine is returned to a fuel injection timing 2-14d for operation at the new steady-state condition at crankshaft angle 2-16d.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for compensating fuel injection timing in a compression-ignited internal combustion engine during a transient response of pre-mixed combustion, comprising the steps of:
    a) determining the presence of a transient condition based upon an indicated change in rate of fueling;
    b) determining whether said transient condition is an engine acceleration or engine deceleration;
    c) determining that said indicated change of rate of fueling exceeds an action threshold;
    d) adjusting said fuel injection timing to a first adjusted fuel injection timing as defined by crankshaft angle based upon a measured engine operating parameter at the start of said transient condition;

e) progressively reducing said first adjusted fuel injection timing toward a new steady-state timing position based upon time from said start of said transient condition; and f) establishing said new steady state timing position at the conclusion of said transient condition.

2. A method in accordance with claim 1 wherein said measured engine operating parameter is engine cylinder wall temperature.

3. A method in accordance with claim 1 comprising the further step of establishing that said engine is operating in a pre-mixed combustion mode before said step a).

4. A method in accordance with claim 1 wherein said transient condition is an acceleration, and wherein said first adjusted fuel injection timing is an advance.

5. A method in accordance with claim 1 wherein said transient condition is a deceleration, and wherein said first adjusted fuel injection timing is a retard.

6. A method in accordance with claim 2 wherein said cylinder wall temperature is calculated from engine operating parameters selected from the group consisting of coolant temperature, oil temperature, previous IMEP, previous heat release, mass air flow, air inlet temperature, exhaust gas recirculation flow, and intake manifold gas temperature.

7. A method in accordance with claim 1 wherein said transient condition is caused by a change in throttle position.

8. A combustion-ignited internal combustion engine comprising a fuel injection system wherein the timing of fuel injection as a function of crankshaft angle is adjustable in accordance with a method including the steps of determining the presence of a transient condition based upon an indicated change in rate of fueling, determining whether said transient condition is an engine acceleration or engine deceleration, determining that said indicated change of rate of fueling exceeds an action threshold, adjusting said fuel injection timing to a first adjusted fuel injection timing as defined by crankshaft angle based upon a measured engine operating parameter at the start of said transient condition, progressively reducing said first adjusted fuel injection timing toward a new steady-state timing position based upon time from said start of said transient condition, and establishing said new steady state timing position at the conclusion of said transient condition.

9. A method in accordance with claim 8 wherein said measured engine operating parameter is engine cylinder wall temperature.

* * * * *